United States Patent [19]

Wisner

[11] 4,110,675

[45] Aug. 29, 1978

[54] RETURN AND POSITION CONTROL FOR A DC SERVO SYSTEM

[75] Inventor: Daniel A. Wisner, Milan, Mich.

[73] Assignee: Burroughs Corporation, Detroit, Mich.

[21] Appl. No.: 804,552

[22] Filed: Jun. 8, 1977

[51] Int. Cl.$^2$ .............................................. G05B 1/01
[52] U.S. Cl. .................................. 318/606; 318/282; 318/603; 318/640
[58] Field of Search ............... 318/606, 607, 608, 640, 318/313, 282, 627, 603

[56] References Cited

U.S. PATENT DOCUMENTS

| | | | |
|---|---|---|---|
| 2,941,033 | 6/1960 | Fromm et al. | 318/313 X |
| 3,786,333 | 1/1974 | Sommeria | 318/606 X |
| 3,828,168 | 8/1974 | Callaghan et al. | 318/607 |
| 3,889,169 | 6/1975 | Hirschman et al. | 318/608 X |
| 3,952,237 | 4/1976 | Kimizuka | 318/313 X |

*Primary Examiner*—B. Dobeck
*Attorney, Agent, or Firm*—David R. Syrowik; Carl Fissell, Jr.; Kevin R. Peterson

[57] ABSTRACT

An apparatus is provided for controllably moving a load in a return mode back to a first or home position by a motor driven shaft, which shaft moves the load toward a second position in a forward mode to track a moving object field. An apertured fan-shaped timing disk or element is secured to the rotating shaft to move therewith. A position feedback sensor senses the angular displacement of the shaft by generating a feedback signal upon optoelectronically sensing an aperture in both the forward and return modes. An optoelectronic sensor detects the passage of the moving object field to provide a return signal after the object field has passed a predetermined position. A motor and its amplifier controllably move the load back to the first position in the return mode in response to the return signal. The inertia of the system causes the shaft to rotate to move the load to the second position in the return mode after responding to the return signal. A return home circuit is responsive to the difference in the number of feedback signals in the forward mode and the up-to-date or current number of feedback signals in the return mode to provide an accelerating bias signal and then a decelerating bias signal to the amplifier to accelerate and decelerate the load respectively as the load moves back towards the first position.

15 Claims, 5 Drawing Figures

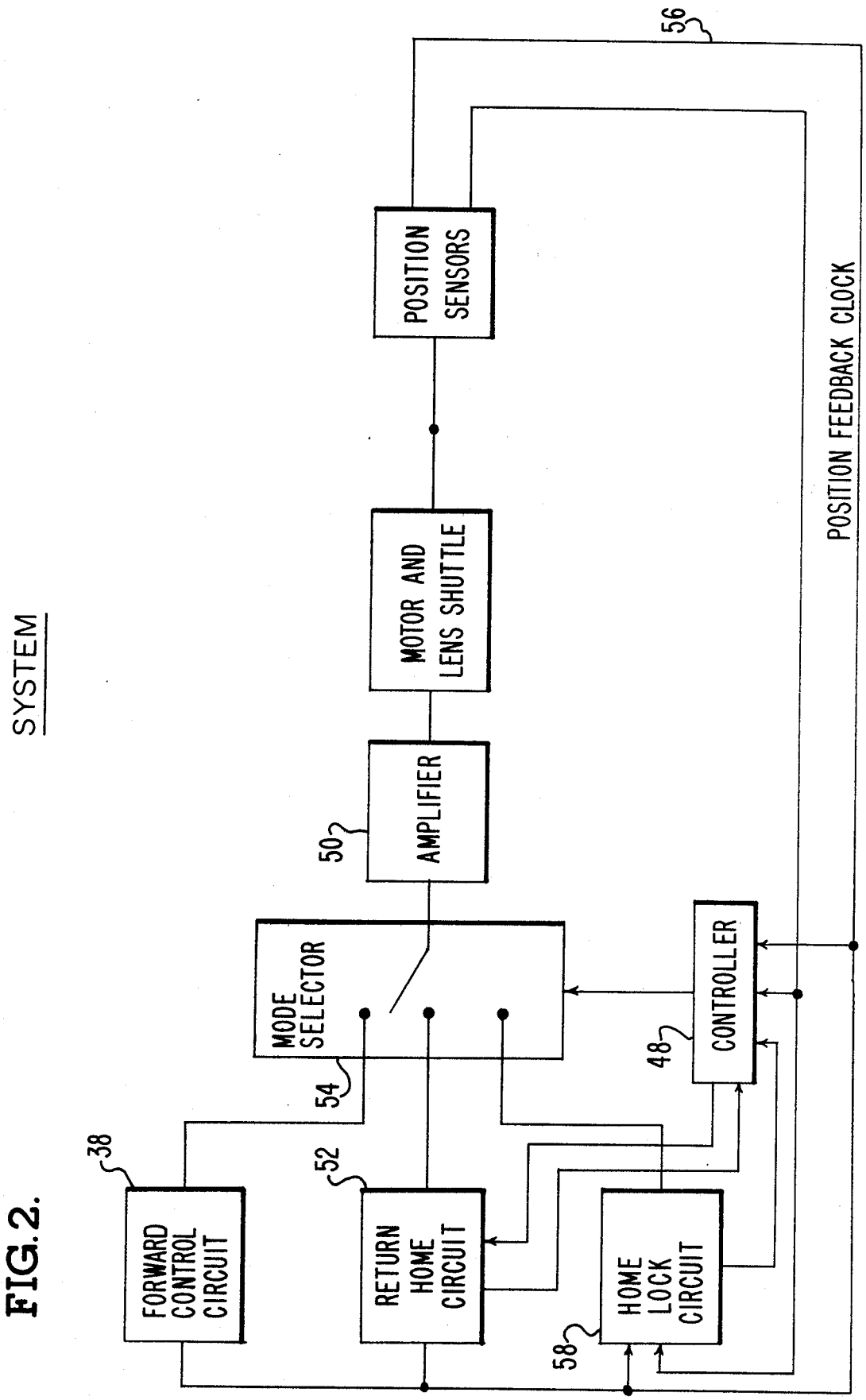

RETURN AND POSITION CONTROL FOR A DC SERVO SYSTEM

BACKGROUND OF THE INVENTION

The present invention relates in general to motion control systems and in particular to incremental motion control systems.

In servo control systems or incremental motion systems such as the one described and claimed in U.S. Ser. No. 804,553 entitled "Servo Control System" filed in June, 1977 by Jacob Tal and having a common assignee as the subject application, it is necessary to controllably move a load such as the lens system or shuttle of a camera back to a first position after following a moving object field and lock the load in this position. In a document processing system such as the one described in U.S. Ser. No. 723,361, entitled "Document Photography Sytem", and having a common assignee as the subject application, the return to the first position and its locking therein must be accomplished very quickly in order to film documents which vary from 4.875 to 9.25 inches in length, and which move at a rate of 100 inches per second to thereby process up to 600 documents per minute. The subject application describes and claims improvements over the Jacob Tal application in the return home circuit, the home lock circuit, the controller and position sensors, and the relationships therebetween to provide even greater speed and accuracy in returning and locking the load in its first or home position. The present invention's nearly all digital circuitry avoids many of the problems inherent in an analog system, such as frequent adjustments of amplifiers to compensate for variations in temperature and power supply voltage.

Also, the subject invention includes a method and apparatus for locking the servo system on the edge of a timing disk as opposed to locking on a slot in the timing disk as shown in the Jacob Tal application. Therefore, precise mechanical adjustment need not be made to sense the slot but rather the position sensor can be fixedly positioned so as to sense only the edge of the timing disk. As a result, the return movement of the timing disk is not only quickly affected, but also, the timing disk is very accurately locked into position in readiment to track or follow a second document.

The apparatus of the subject invention controllably moves a load in a return mode back to a first position after being moved towards a second position by a forward control circuit. The load is moved from the first position in a forward mode by a motor to track a moving object field. The load has a displacement resulting from moving from the first position towards the second position. The apparatus, constructed in accordance with the instant invention, comprises a sensing means for sensing the displacement of the load by generating a feedback signal at predetermined intervals along the displacement in both of the forward and return modes. Detecting means detect the passage of the moving object field to provide a return signal after the object field has passed a predetermined position. A driving means controllably moves to load back towards the first position in the return mode in response to the return signal. The driving means includes the motor for supplying the moving force. The motor moves the load to the second position in the return mode after responding to the return signal to define an overshoot displacement. A return home circuit means is responsive to the difference in the number of feedback signals in the forward mode and the current number of feedback signals in the return mode for providing an energizing bias signal to the driving means to cause the driving means to move the load back to the first position.

Other advantages of the present invention will be readily appreciated as the same becomes better understood by reference to the following detailed description when considered in connection with the drawings wherein:

FIG. 2 is a block diagram showing the subject apparatus in its operating environment;

PREFERRED EMBODIMENT OF THE INVENTION

Figure 1:
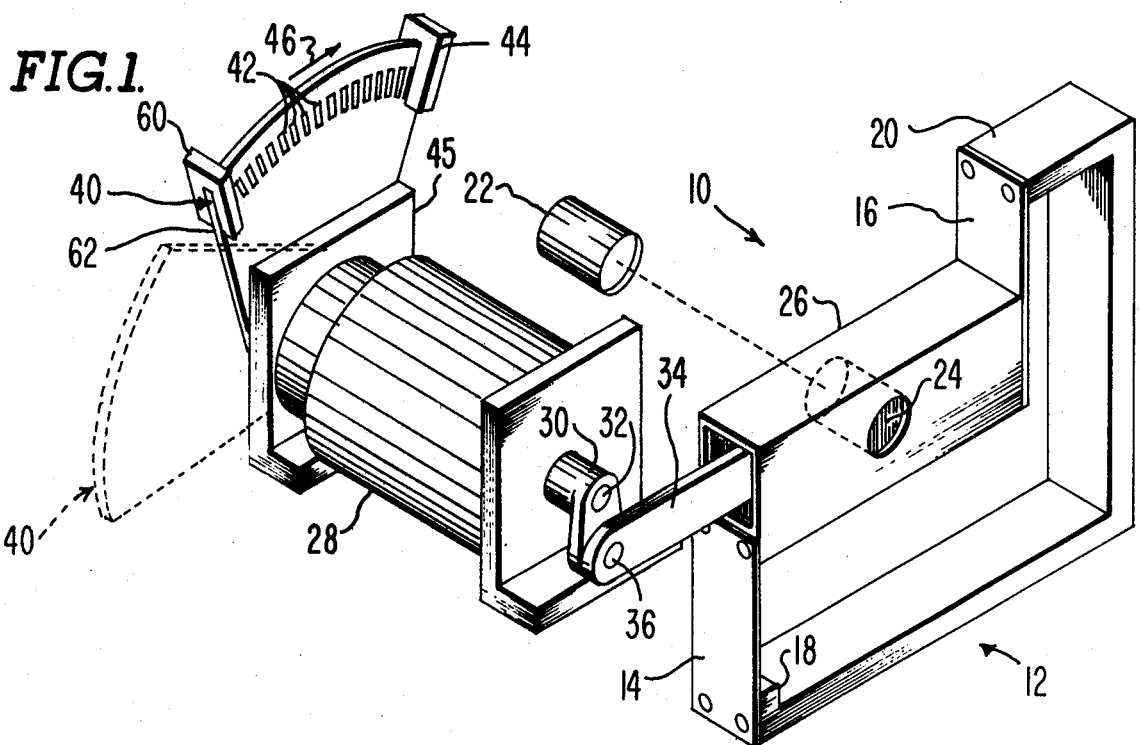
FIG. 1 is a schematic view showing the subject apparatus in its operating environment.

FIG. 1 shows, schematically, the apparatus of the subject invention for controllably moving a load such as a lens shuttle generally indicated at 10. The lens shuttle is supported by a lens mounting generally indicated at 12. The lens mounting 12 includes a pair of vertical support members 14 and 16 which are fixedly secured at their opposite ends to flanges 18 and 20 respectively, of the lens mounting 12 and at the opposite ends of the lens shuttle 10. The vertical members 14 and 16 act as leaf springs to resist any horizontal movement of the lens shuttle 10 along its longitudinal axis away from its neutral or first home locking position as shown in FIG. 1.

As previously described in patent application Ser. No. 723,361 entitled "Document Photography System" which application is hereby incorporated by reference, the lens shuttle 10 includes a lens system 22 which is disposed in an aperture 24 which extends therethrough the lens housing 26 of the lens shuttle 10 perpendicular to the longitudinal axis of the lens shuttle 10.

As previously described in the patent application by Jacob Tal, Ser. No. 804,553, which application is also hereby incorporated by reference, a motor 28 moves the lens shuttle 10 to-and-fro through a crank 30 secured to the motor's central shaft 31 (shown in FIG. 5) along the shaft axis 32 and a link 34 which is secured at the eccentric axis 36 of the shaft at the crank 30. The opposite end of the link 34 is secured to the lens shuttle 10 to cause the lens shuttle 10 to move to-and-fro as the shaft of the motor 28 rotates through an angle and then back again.

As previously described in the prior application, a forward control circuit 38, as shown in FIG. 2, controls the motor 28 as it controllably moves the lens shuttle 10 toward a second position from the first position in a forward mode through the motor driven shaft 31 to thereby track or follow a moving object field in the form of information on a moving document 37 through a slit 39. As previously described, the image or object field from the front and back of the moving document 37 is recorded on film 41. The image is effectively wiped on the film 41 after passing through the lens system 22 carried by the lens shuttle 10.

As the motor shaft 31 rotates, a fan-shaped timing disk or element generally indicated at 40 rotates therewith as it is fixedly secured to the motor shaft 31 as previously described in the prior applications. The timing disk 40 has approximately 400 slots or timing apertures 42 extending therethrough the timing disk 40 and sinusoidally spaced apart as previously described in the prior application. While approximately 400 of these apertures 42 are provided in the preferred embodiment of the subject invention, only a portion of them are shown in FIGS. 1 and 5.

A feedback sensor 44 is fixedly disposed on the motor support 45, traverse the path of the timing disk 40 as it rotates in the direction of an arrow 46. As previously described, the feedback sensor 44, in combination with the rotating disk 40, define a sensing means for sensing the angular displacement of the shaft 31 by generating a feedback clock signal upon photoelectronically sensing each of the apertures 42 at the predetermined intervals along the angular displacement of the motor shaft 31 as it rotates forward in its forward mode and backward in its return mode.

Figure 5:
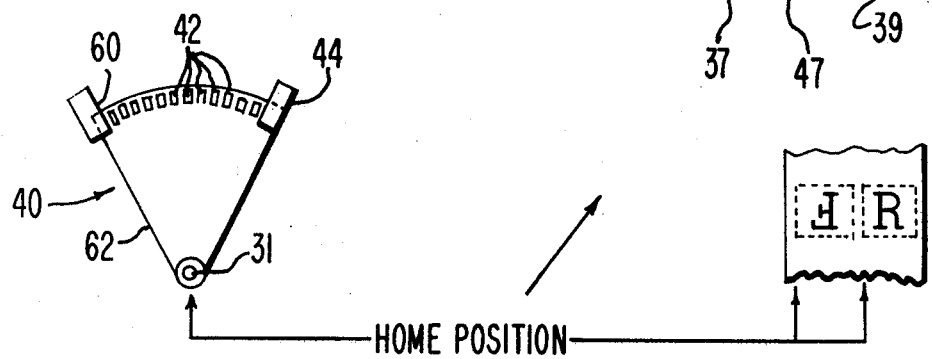
FIG. 5 shows portions of the apparatus in its home or first position.

A controller 48, as shown in FIG. 2, includes a detecting means or a document present sensor 47, shown in FIG. 5, for photoelectronically detecting the passage of the moving document containing object field to provide a return signal after the object field has passed the viewing slit 39. The document present sensor 47 is positioned a predetermined distance away from the slit 39 and emits a document present signal and the return signal. The document present signal causes the shutter (not shown) of the lens system 22 to open and readies the motor 28 to rotate the shaft 31 in response to the reference signal. The return signal is generated after a predetermined number of position feedback clock pulses are sensed by the controller 48 to indicate the passage of the document 37 past the slit 39. The return signal not only initiates the return mode of the system but also closes the lens shutter and advances the film 41 as shown in U.S. patent application Ser. No. 723,383 filed Sept. 15, 1976 by Jack Beery. The return signal signals the beginning of the return mode of the system as will be described in greater detail hereinafter.

An amplifier 50, as previously described in the Jacob Tal application, in combination with the motor 28, define a driving means which controllably moves the lens shuttle 10 back to the first position in the return mode in response to the return signal from the document present sensor. After receiving the return signal to mark the beginning of the return mode, the inertia of this system causes the motor shaft 31 to continue to rotate until the lens shuttle 10 reaches the second position, at which time the velocity of the rotating disk 40 is zero. The angular displacement of the shaft 31 as the shaft 31 moves to the second position after the return signal is defined as an overshoot angular displacement, the importance of which will become more apparent hereinafter.

Figure 4:
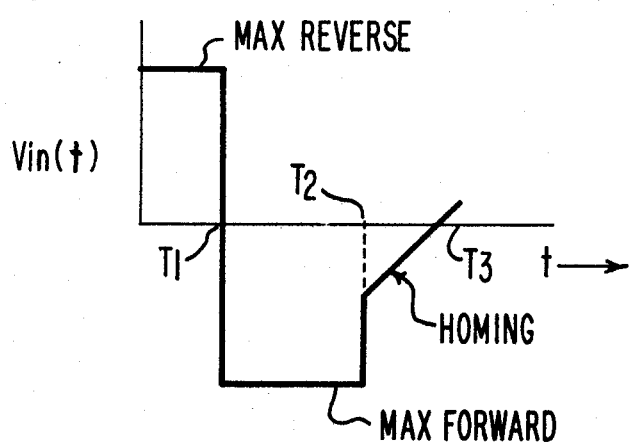
FIG. 4 shows a graph of the control biasing voltages as applied in the return mode of the apparatus.

A return home circuit means or a return home circuit 52 is responsive to the number of position feedback clock signals occurring in the forward mode of the system and the number of position feedback clock signals which occur in the return mode of the system to provide an energizing bias signal to the amplifier 50 after the controller 48 has changed the mode of the system from the forward mode to the return home via a mode selector 54 in response to the return signal. The energizing bias signal is a composite of an accelerating bias signal and a decelerating bias signal as shown in FIG. 4, which causes the motor 28 through the amplifier 50 to alternatingly accelerate and decelerate the lens shuttle 10 as it moves back towards the first position, as will be described in greater detail hereinafter.

As previously described, the feedback sensor 44 provides a position feedback clock signal along a path 56 to the forward control circuit 38, the return home circuit 52, the controller 48 and a home lock circuit means or a home lock circuit 58. The home lock circuit 58 indicates when the lens shuttle 10 is locked in its first or home locking position.

The system also includes a position locking means or a locking sensor 60 which is repsonsive to one of the edges 62 of the timing disk 40 for locking the lens shuttle 10 in the first position. When locked in the first position, the apparatus is ready to film a second moving object field in the form of a moving document.

A more detailed description of the return home circuit 52, the home lock circuit 58, and the locking sensor 60 will now be given with reference to FIG. 3 beginning with the initialization of the circuit before any forward movement of the timing disk in its forward mode and ending with the lens shuttle 10 locked in its home locking position in readiment for filming a moving document.

Figure 3:
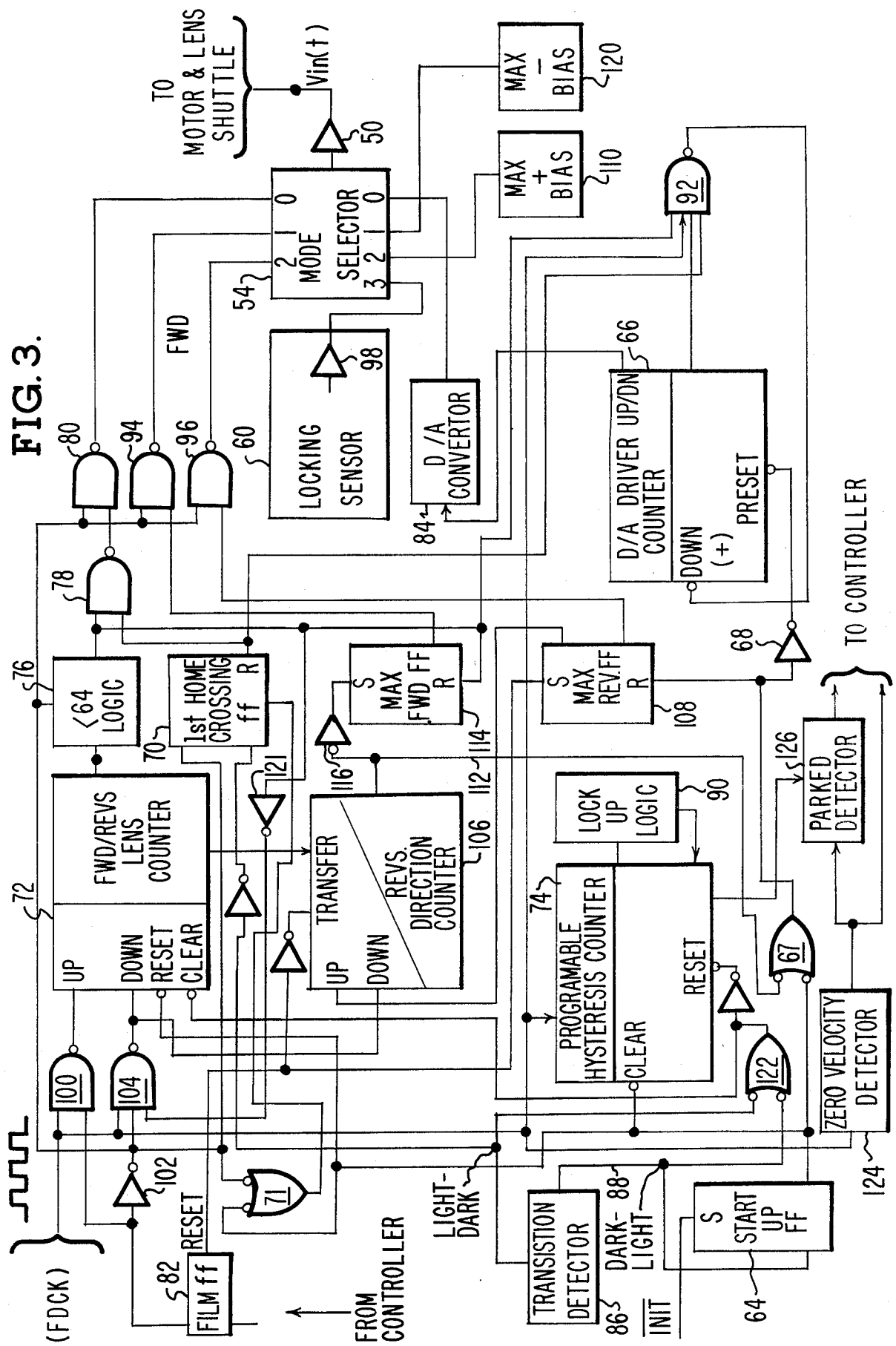
FIG. 3 is a part block diagram and part logic diagram showing the operation of the subject invention.

Referring now to FIG. 3, a description will now be given of how to place the system in a condition to accurately follow one moving document after another.

A INIT signal is initialized by an operator of the system to set a start-up flip flop 64 which in turn presets a digital-to-analog driver counter 6 through a NOR gate 67 and an inverter 68. The counter 66 comprises two four-bit binary up/down counters electrically interconnected so as to function as an eight-bit binary up/down counter. When the counter is preset, it is preset to a value of all ones of 1111 1111. The start-up flip flop 64 also resets a first home crossing flip flop 70 through a NOR gate 71 and resets a forward/reverse up/down lens counter 72 to remove any extraneous bits. The counter 72 comprises three four-bit binary up/down counters electrically interconnected to function as one 12-bit binary up/down counter. The start-up flip flop 64, at the same time, also clears a programmable hysteresis counter 74 which comprises a four-bit binary counter.

At the time this initialization process is going on, the rotating element 40 which was positioned as shown by the phantom lines in FIG. 1 starts rotating in its forward direction. The fact that the counter 72 is reset to zero is sensed by less-than-64 logic circuitry 76, which, together with the $\overline{Q}$ output of the first home crossing flip flop 70, enables a NAND gate 78 which in turn enables a first control flip flop 80 of the controller 48. The NAND gate 78 is enabled due to the fact that a film flip flop 82 is not set, as indicated by the low state of its $\overline{Q}$ output, by the controller 48, which set condition would indicate that the system is in its forward mode. The resulting low signal outputted by the first control NAND gate 80 causes the mode selector, or analog multiplexer switch 54 to switch-in its zero input, which is the output of a digital-to-analog converter 84 which converts the output of the counter 66 into a corresponding analog signal. The second through seventh bit positions of the counter 66 are fed to the D to A converter 84 which resulting analog signal is then outputted by the mode selector 54 through the servo amplifier 50 to obtain a resulting $V_{in}(t)$ which is fed to the motor 28. The seventh bit position of the counter 66 indicates to the D to A converter 84 whether a negative or positive bias is to be outputted, a one in the seventh bit position indicating that a negative bias is to be supplied to cause forward motion, whereas a zero in the seventh bit position would cause a positive or reverse-causing bias to be supplied the motor 28 through the amplifier 50.

Referring again to FIG. 1, the timing disk 40 rotates past the locking sensor 60 until the INIT signal is released and until the locking sensor 60 senses the edge 62 of the rotating disk 40. The locking sensor 60 includes a transition detector means or transition detector 86 which photoelectronically senses the edge 62 of the rotating element 40 by outputting a dark-to-light signal or a light-to-dark signal. The dark-to-light signal indicates movement of the rotating element 40 to allow the passage of light between, for example, a photodiode and a phototransistor of the locking sensor 60. The light-to-dark signal is provided by the transistion detector 86 when the passage of the rotating element 40 causes the previously unimpeded light rays to be obstructed or blocked by the rotating element 40 at its edge 62.

After the INIT signal is released and when the dark-to-light transition signal occurs on the line 88, the start-up flip flop 64 changes state to thereby clear the hysteresis counter 74. At this time the feedback sensor 44 starts counting up the counter 74 until lock-up logic circuitry 90 locks up the counter 74 at a predetermined count of four, which count is determined by the lock-up logic 90. Also, at this time, a NAND logic gate 92 is enabled by the feedback clock signals, the less-than-64 logic 76, and the $\overline{Q}$ output of the flip flop 70 to start down-counting the D to A counter 66. As the counter 66 counts down, the strength of the negative bias signal supplied by the D to A converter 84 decreases until the spring force exerted by the vertical members 14 and 16 is sufficient to overcome the forward driving torque of the motor 28. The spring force of the vertical members 14 and 16 is sufficient to move the shaft 31 and therefore the rotating element 40 back towards the first position until the locking sensor 60 senses the edge 62 of the timing disk 40 by means of the transition detector 86. The transition detector 86 provides a light-to-dark signal which causes the first home crossing flip flop 70 to enter a one or high state thereby disabling the NAND gate 78. As a result, the first control NAND gate 80, a second control NAND gate 94, and a third control NAND gate 96 all output a low signal which causes the analog multiplexer switch 54 to switch-in the linear amplifier output of a generating means or amplifier 98 of the locking sensor 60. The output of the locking sensor 60 varies linearly between plus or minus 5 volts over a 0.009 inch which output causes the shaft 31 to move the lens shuttle 10 into the home locking position. The system can now be said to be in its home lock mode which typically follows the return home mode of the system to lock the lens shuttle 10 in a home locking position. The home lock mode of the system will be described in greater detail hereinafter after the return home mode is described.

After the system has locked on the edge 62 of the timing element 40, the system is in a position to follow a reference signal, as described in the prior application, to track the moving object field or the document 37 in its forward mode. At this time, the controller 48, which includes a minicomputer, isses a command to set the film flip flop 82 to thereby disable all three control NAND gates 80, 94 and 96 and allow the forward control circuit 38 to control the motor 28 through the amplifier 50. As a result, as the lens shuttle 10 moves from the first position towards the second position in tracking the document 37, the position feedback clock signals are used to count up the counter 72 by means of an enabled NAND gate 100. When the document present sensor 47 of the controller 48 determines that the document 37 has moved past the viewing slit 39, the controller 48 resets the film flip flop 82. The $\overline{Q}$ output of the film flip flop 82 is inverted by an inverter 102, which signal is thereafter used as an input to the first, second and third control NAND gates 80, 94 and 96 respectively to control the return movement of the lens shuttle 10 and the timing disk 40. The output of the inverter 102 also is inputted to a NAND gate 104 which is thereby enabled as long as the contents of the counter 72 are more than 64 to count down the counter 72.

Concurrently, the reset or return signal from the controller 48 transfers one quarter of the contents of the counter 72 which represents the number of feedback signals and therefore the angular displacement of the shaft 31 in the forward mode into a reverse direction counter 106 which comprises two four-bit up/down binary counters electrically interconnected to function as one eight-bit binary up/down counter. The return home circuit 52 includes a return means responsive to the reset signal from the controller 48 to supply a reverse signal. The return means includes a maximum reverse flip flop 108 which is set by the reset signal thereby disabling the third control NAND gate 96 to output a high signal into the analog multiplexer switch 54. This high signal into the analog multiplexer switch 54 causes a maximum positive bias represented by block 110 to be inputted via input two of the multiplexer switch 54 to the amplifier 50 to develop that portion of the signal $V_{in}(t)$ (i.e. the maximum reverse signal) between times T=0 to T=T1.

During this maximum reverse motion the output of the NAND gate 104 is down-counting both the counter 72 and the counter 106 until none of the one-quarter transferred pulses remain in the counter 106. The return home circuit 52 includes a deceleration means responsive to the one-quarter of counted down signals. The deceleration means includes a maximum forward flip flop 114 which is set along the lead line 112 through an inverter 116. This signal along lead line 112 also resets the maximum reverse flip flop 108 through the NOR gate 67 thereby causing the third control NAND gate 96 to go low.

The maximum forward flip flop 114 through its $\overline{Q}$ output disables the second control NAND gate 94 so that it outputs a high signal to the analog multiplexer switch 54. As a result, a maximum negative bias presented by a block 120 is switched-in at input one of the switch 54 to the servo amp 50 to develop a maximum forward causing signal of $V_{in}(t)$ as shown in FIG. 4 between times T=T1 and T=T2.

The return home circuit means includes a braking means for supplying a gradually decreasing braking signal at time T=T2. The braking means includes the less-than-64 logic block 76 which senses that the count 72 has counted to a count less than 64. The logic block 76 disables the down counting of the counter 72 through an inverter 121 and the NAND gate 104 and also resets the maximum forward flip flop 114 to thereby cause a low signal to be outputted by the second control NAND gate 94. At the same time the logic block 76 and the first home crossing flip flop 70 enable the NAND gate 78 to output a low signal, thereby disabling the first control NAND gate 80 to output a high signal which causes the analog multiplexer switch 54 to switch-in the output of the D to A converter 84 of the braking means at the zero input.

At time T=T2, the contents of the D to A up/down counter 66 is all ones due to the fact that the counter 66 was preset by the NOR gate 67 at the time the maximum reverse flip flop 108 was reset. As long as the $\overline{Q}$ output of the first home crossing flip flop 70 continues to remain high, the NAND gate 92 down counts the counter 66 so that an increasingly smaller and smaller negative homing signal is outputted by the D to A converter 84 via the analog multiplexer switch 54 to the amplifier 50 to develop the homing signal of $V_{in}(t)$ as shown in FIG. 4.

The homing signal is shown in FIG. 4 as a straight line signal. However, it is to be understood that the homing signal becomes increasingly less negative in a small step-wise fashion. As soon as the seventh bit in the counter 66 goes from a one to a zero state or from a high to a low state, respectively, this indicates that the count contained in the counter 66 has reached a count of 64 which would normally indicate that the lens shuttle 10 has moved back to its first position. However, due to the fact that the counter 72 started down counting as soon as it received the reset signal from the controller 48, the extra position feedback clock pulses developed as the lens shuttle 10 and the timing element 40 continued to rotate to the second position count down the counter 72 before the lens shuttle reaches the first position. In other words, the overshoot angular displacement and the resulting extra position feedback clock signals cause the counter 66 to reach a count of 64 from 128 without the lens shuttle 10 being in its first position. As a result, these extra pulses cause the counter 66 to continue to down-count, thereby resulting in a continually increasing bias signal being applied to the amplifier 50 through the analog multiplexer switch 54 as shown in FIG. 4 until the time T=T3. At time T=T3 the transition detector 86 of the locking sensor 60 emits a light-to-dark signal which causes the first home crossing flip flop 70 to enter its one or high state to disable the NAND gate 78 and enable the NAND gate 80 to emit a low signal. At this time all three inputs from the first, second and third control NAND gates 80, 94 and 96 respectively, are in a low state which causes analog multiplexer switch 54 to select the linear amplifier output from the amplifier 98 of the locking sensor 60 at input three as previously described.

At the time of the light-to-dark transition the counter 72 is cleared and the counter 74 is reset by way of a NOR gate 122. The counter 74 continues to count the number of position feedback clock signals if the rotating disk 40 continues to rotate until the counter 74 reaches a count of four, at which time the lock-up logic 90 locks the counter 72 at this count.

A zero velocity detector 124 which comprises a delay multivibrator in the preferred embodiment of the instant invention seeks to determine a zero or minimal velocity of the shaft through the position feedback clock signals by outputting directly to the controller 48 a signal indicating that no feedback pulses are being received within a predetermined time frame determined by the multivibrator. The output of the zero velocity detector 124 is also inputted to a parked detector 126 which is also responsive to the unlocked condition of the counter 74. The parked detector 126 outputs a signal to the controller 48 if the zero velocity detector 124 fails to detect a position feedback clock signal within the predetermined time period at the same time the counter 74 is less than a count of four. This fact indicates that the motor shaft is not rotating or is rotating a minimal amount within four position feedback clock signals after the edge 62 of the timing disk 40 has been detected by the transition detector 86 by means of a light-to-dark or a dark-to-light signal, which signals reset the counter 74 through the NOR gate 122.

The signal emitted by the parked detector 126 to the controller 48 indicates that the lens shuttle 10 is in the home locking position. The controller 48 is now able to issue a command to the film flip flop 82 to film a second moving document.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. An apparatus for controllably moving a load in a return mode back to a first position after being controllably moved toward a second position from the first position in a forward mode by a motor controlled by a forward control circuit to track a moving object field, the load having a displacement resulting from moving from the first position toward the second position, said apparatus comprising:
   sensing means for sensing the displacement of the load by generating a feedback signal at predetermined intervals along said displacement in both of said forward and return modes;
   detecting means for detecting the passage of said moving object field to provide a return signal after the object field has passed a predetermined position;
   driving means for controllably moving the load back towards the first position in the return mode in response to said return signal, said driving means including the motor for supplying said moving force, the motor moving the load to the second position in the return mode after responding to said return signal to define an overshoot displacement; and
   return home circuit means repsonsive to the difference in the number of feedback signals in the forward mode and the current number of feedback signals in the return mode for providing an energizing bias signal to said driving means to cause said driving means to move the load back to the first position.

2. The apparatus as defined in claim 1 wherein said apparatus includes a rotating element having a pair of side edges, said rotating element being operatively associated with said shaft to rotate therewith.

3. The apparatus as defined in claim 2 wherein said apparatus further comprises position locking means responsive to one of said edges for locking said load in said first position, said first position defining a home locking position.

4. The apparatus as defined in claim 3 wherein said position locking means includes transition detector means fixedly disposed traverse the path of said moving edge for detecting said edge as it moves to-and-fro past said transition detector means.

5. The apparatus as defined in claim 4 wherein said position locking means includes generating means responsive to said transition detector means for generating an output signal proportional to the distance said edge moves after detection, said output signal causing said driving means to move the load towards said first position.

6. The apparatus as defined in claim 5 further comprising home lock circuit means responsive to a predetermined number of feedback signals occurring within a predetermined time period after said detections for indicating when said load is in said home locking position.

7. The apparatus as defined in claim 6 wherein said sensing means includes a tachometer and wherein said rotating element includes an array of spaced-apart light apertures disposed therethrough the element to define a portion of said tachometer, said tachometer including an optoelectronic means fixedly positioned adjacent said rotating element for generating a feedback signal upon optoelectronically sensing each of said apertures.

8. The apparatus as defined in claim 1 wherein said return home circuit means includes return means responsive to said return signal for supplying a reverse signal to said drive means until said difference is a predetermined fraction of the number of signals in the forward mode to move the load back towards the first position.

9. The apparatus as defined in claim 8 wherein said return home circuit means includes deceleration means responsive to said predetermined fraction for supplying a deceleration signal to retard the backward movement of the load until said difference is below a predetermined amount.

10. The apparatus as defined in claim 9 wherein said return home circuit means includes braking means responsive to said difference being below said predetermined amount for supplying a braking signal decreasing in magnitude to gradually decelerate said backward movement.

11. The apparatus as defined in claim 9 wherein said return home circuit means includes braking means for supplying a braking signal decreasing in magnitude to gradually decelerate said backward movement and thereafter a reverse signal increasing in magnitude, said increasing reverse signal increasing to a magnitude proportional to the number of feedback signals defining said overshoot displacement.

12. The apparatus as defined in claim 11 wherein said return means includes an up/down counter for counting up said feedback signals in the forward mode and counting down said feedback signals in the return mode.

13. The apparatus as defined in claim 12 wherein said sensing means includes a tachometer operatively associated with said shaft to rotate therewith, said tachometer including a rotating element having a pair of side edges.

14. The apparatus as defined in claim 13 wherein said apparatus further comprises position locking means for tracking one of said edges upon sensing said edge by providing a tracking signal to said driving means to thereby move the load towards home locking position.

15. An apparatus for controllably moving a load in a return mode back to a first position after being moved toward a second position by a forward control circuit from the first position in a forward mode by a motor driven shaft to track a moving object field, the shaft having an angular displacement resulting from moving the load from the first position toward the second position, said apparatus comprising:
sensing means for sensing the angular displacement of the shaft by generating a feedback signal at predetermined intervals along said angular displacement in both of said forward and return modes;
detecting means for detecting the passage of said moving object field to provide a return signal after the object field has passed a predetermined position;
driving means for controllably moving the load back towards the first position in the return mode in response to said return signal, said driving means including a motor having the motor driven shaft for supplying said moving force, the shaft rotating to move the load to the second position in the return mode after responding to said return signal to define an overshoot angular displacement; and
return home circuit means responsive to the difference in the number of feedback signals in the forward mode and the current number of feedback signals in the return mode for providing an accelerating bias signal and a decelerating bias signal to said driving means alternatingly accelerating and decelerating said load in response thereto as said load moves toward said first position.

* * * * *